(12) United States Patent
Chao

(10) Patent No.: US 7,847,862 B2
(45) Date of Patent: Dec. 7, 2010

(54) METHODS FOR CROSS COLOR AND/OR CROSS LUMINANCE SUPPRESSION

(75) Inventor: Po-Wei Chao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 757 days.

(21) Appl. No.: 11/760,792

(22) Filed: Jun. 11, 2007

(65) Prior Publication Data

US 2007/0258013 A1   Nov. 8, 2007

Related U.S. Application Data

(63) Continuation of application No. 10/710,072, filed on Jun. 16, 2004, now Pat. No. 7,280,159.

(51) Int. Cl.
*H04N 9/64* (2006.01)
*H04N 9/77* (2006.01)
*H04N 5/21* (2006.01)

(52) U.S. Cl. .................. 348/609; 348/701; 348/666; 348/624; 348/621

(58) Field of Classification Search ................ 348/609, 348/666, 624, 713, 700, 701, 699, 670, 452, 348/451, 621; 382/275, 162, 167
See application file for complete search history.

(56) References Cited

U.S. PATENT DOCUMENTS

| | | | |
|---|---|---|---|
| 4,530,004 A | 7/1985 | Achiha et al. |
| 4,670,773 A | 6/1987 | Silverberg |
| 4,706,112 A | 11/1987 | Faroudja |
| 4,723,157 A | 2/1988 | Wendland et al. |
| 4,731,660 A | 3/1988 | Faroudja |
| 4,831,463 A | 5/1989 | Faroudja |
| 4,837,611 A | 6/1989 | Faroudja |
| 4,893,176 A | 1/1990 | Faroudja |
| 4,916,526 A | 4/1990 | Faroudja |
| 4,918,515 A | 4/1990 | Faroudja |
| 4,943,849 A | 7/1990 | Faroudja |
| 4,967,271 A | 10/1990 | Campbell et al. |
| 4,982,280 A | 1/1991 | Lyon |
| 4,984,068 A | 1/1991 | Sugiyama et al. |
| 5,012,329 A | 4/1991 | Lang et al. |
| 5,019,895 A | 5/1991 | Yamamoto et al. |
| 5,023,713 A | 6/1991 | Nishigori |
| 5,027,194 A | 6/1991 | Scheffler |
| 5,051,826 A | 9/1991 | Ishii |
| 5,055,920 A | 10/1991 | Illetschko et al. |
| 5,063,438 A | 11/1991 | Faroudja |

(Continued)

*Primary Examiner*—David L Ometz
*Assistant Examiner*—Jean W Désir
(74) *Attorney, Agent, or Firm*—Thomas, Kayden, Horstemeyer & Risley, LLP

(57) ABSTRACT

A method for processing an image in a video data is provided. The video data has a plurality of frames. The method includes: obtaining a plurality of differences, each difference in the plurality of differences being obtained from two frames that are one frame apart, wherein the each difference in the plurality of differences is between pixel information of one pixel from a plurality of pixels in one of the two frames, and a corresponding pixel in the other frame of the two frames; examining a first criterion with a summation of the plurality of differences; and performing cross color suppressing operation on a current frame of the plurality of frames according to a set of stationary image judgment information comprising the result of the first criterion examination.

17 Claims, 5 Drawing Sheets

U.S. PATENT DOCUMENTS

| | | |
|---|---|---|
| 5,146,318 A | 9/1992 | Ishizuka et al. |
| 5,249,037 A | 9/1993 | Sugiyama et al. |
| 5,305,095 A | 4/1994 | Song |
| 5,305,120 A | 4/1994 | Faroudja |
| 5,428,398 A | 6/1995 | Faroudja |
| 5,448,305 A | 9/1995 | Hagino |
| 5,457,501 A | 10/1995 | Hong |
| 5,475,438 A | 12/1995 | Bretl |
| 5,483,294 A | 1/1996 | Kays |
| 5,502,509 A | 3/1996 | Kurashita et al. |
| 5,689,301 A | 11/1997 | Christopher |
| 6,034,733 A | 3/2000 | Balram |
| 6,052,312 A | 4/2000 | Ishii |
| 6,108,041 A | 8/2000 | Faroudja |
| 6,133,957 A | 10/2000 | Campbell |
| 6,317,165 B1 | 11/2001 | Balram |
| 6,377,308 B1 | 4/2002 | Cahill |
| 6,580,463 B2 | 6/2003 | Swartz |
| 6,891,571 B2 | 5/2005 | Shin |
| 6,956,620 B2 | 10/2005 | Na |
| 6,987,884 B2 | 1/2006 | Kondo et al. |
| 6,995,804 B2 | 2/2006 | Kwon et al. |
| 7,061,548 B2 | 6/2006 | Piepers |
| 7,084,923 B2 | 8/2006 | Brown |
| 7,098,957 B2 | 8/2006 | Kim et al. |
| 7,154,556 B1 | 12/2006 | Wang |
| 7,227,587 B2 * | 6/2007 | MacInnis et al. ............ 348/667 |
| 7,271,850 B2 | 9/2007 | Chao |
| 7,280,159 B2 | 10/2007 | Chao |
| 7,423,691 B2 | 9/2008 | Orlick |
| 7,432,987 B2 * | 10/2008 | Shan et al. .................. 348/667 |
| 2002/0093587 A1 | 7/2002 | Michel |
| 2003/0112369 A1 | 6/2003 | Yoo |
| 2004/0017507 A1 | 1/2004 | Clayton |
| 2004/0114048 A1 | 6/2004 | Jung |
| 2005/0018086 A1 | 1/2005 | Lee |
| 2005/0134745 A1 | 6/2005 | Bacche et al. |
| 2005/0168650 A1 | 8/2005 | Walls et al. |
| 2005/0270415 A1 | 12/2005 | Jiang |
| 2006/0187344 A1 | 8/2006 | Corral |
| 2006/0203125 A1 | 9/2006 | Sayre |
| 2006/0228022 A1 | 10/2006 | Chao |

* cited by examiner

| Frame 0 | | |
|---|---|---|
| Ae | Be | Ce |
| Ao | Bo | Co |
| De | Ee | Fe |
| Do | Eo | Fo |
| Ge | He | Ie |
| Go | Ho | Io |

| Frame 1 | | |
|---|---|---|
| A'e | B'e | C'e |
| A'o | B'o | C'o |
| D'e | E'e | F'e |
| D'o | E'o | F'o |
| G'e | H'e | I'e |
| G'o | H'o | I'o |

| Frame 2 | | |
|---|---|---|
| A''e | B''e | C''e |
| A''o | B''o | C''o |
| D''e | E''e | F''e |
| D''o | E''o | F''o |
| G''e | H''e | I''e |
| G''o | H''o | I''o |

| Frame 3 | | |
|---|---|---|
| A'''e | B'''e | C'''e |
| A'''o | B'''o | C'''o |
| D'''e | E'''e | F'''e |
| D'''o | E'''o | F'''o |
| G'''e | H'''e | I'''e |
| G'''o | H'''o | I'''o |

Fig. 3

METHODS FOR CROSS COLOR AND/OR CROSS LUMINANCE SUPPRESSION

CROSS REFERENCE TO RELATED APPLICATIONS

This continuation application claims the benefit of co-pending U.S. patent application Ser. No. 10/710,072, filed on Jun. 16, 2004 (now U.S. Pat. No. 7,280,159) and incorporated herein by reference.

BACKGROUND OF THE INVENTION

1. Field of the Invention

The present invention relates to methods for improving display quality of an image. More specifically, the present invention is directed to methods of performing cross color and/or cross luminance suppression to improve display quality.

2. Description of the Prior Art

In composite video television systems such as NTSC and PAL, a luminance signal and a chrominance signal share a portion of the available bandwidth. In NTSC, for example, chrominance information is encoded through a sub-carrier having frequency equaling 3.57955 MHz. Within the chrominance band extending from roughly 2.3 MHz to 4.2 MHz, the luminance spectrum overlaps that chrominance spectrum. This overlap results in signal interference.

It is well-known that a television decoder is implemented to extract both luminance information and chrominance information from the received composite signal; however, a typical simple television decoder cannot discern which of the higher frequency components are luminance information and which are chrominance information. As a result, such a television decoder generates incorrect chrominance information owing to the interference introduced via the luminance spectrum. The term "cross color" is commonly referred to as corruption of the chrominance spectrum caused by the misinterpretation of high-frequency luminance information as wanted chrominance information. Conversely, the term "cross luminance" is commonly referred to as corruption of the luminance spectrum caused by the misinterpretation of chrominance information as high-frequency luminance information.

Some conventional methods reduce cross color by operating upon chrominance information encoded on the chrominance subcarrier prior to demodulation into baseband chrominance information. These methods typically incorporate cross color suppression into the decoding process, focusing on improving the separation of the chrominance and luminance information to reduce both cross color and cross luminance.

However, cross color suppression is very desirable in applications where only demodulated baseband chrominance information is available, especially where demodulation was performed without much regard for suppressing cross color. In such applications, for practical reasons, cross color suppression must be performed in the baseband domain.

As such, Faroudja describes a technique for suppressing cross color in U.S. Pat. No. 5,305,120, the contents of which are hereby incorporated by reference. Although Faroudja suggests a feasible approach for post-decoding cross color suppression, a more optimized motion detection algorithm is desired in order to minimize possible error occurrence in the outcome of cross color suppression caused by over-simplified stationary image judgment.

SUMMARY OF THE INVENTION

It is therefore one of the objectives of the claimed invention to provide methods of suppressing cross color and/or cross luminance of an image by introducing a well-designed motion detection algorithm.

According to one exemplary embodiment of the present invention, a method for processing an image in a video data is provided. The video data comprises a plurality of frames. The method comprises: obtaining a plurality of differences, each difference in the plurality of differences being obtained from two frames that are one frame apart, wherein the each difference in the plurality of differences is between pixel information of one pixel from a plurality of pixels in one of the two frames, and a corresponding pixel in the other frame of the two frames; examining a first criterion with a summation of the plurality of differences; and performing cross color suppressing operation on a current frame of the plurality of frames according to a set of stationary image judgment information comprising the result of the first criterion examination.

According to another exemplary embodiment of the present invention, a method for processing an image in a video data is provided. The video data comprises a plurality of frames. The method comprises: obtaining a first difference set between pixel information of one of the frames and pixel information of another one of the frames, wherein the two frames involving the first difference set are one frame apart, and the first difference set comprises a plurality of differences, each difference of the plurality of differences being between pixel information of a pixel in one of the two frames involving the first difference set and pixel information of a corresponding pixel in the other one of the two frames involving the first difference set; summing the absolute values of each difference in the plurality of differences of the first difference set to thereby obtain a sum of absolute differences; examining a first criterion according to the sum of absolute differences; and performing cross color suppressing operation on pixel information of a current frame of the plurality of frames according to a set of stationary image judgment information comprising the result of the first criterion examination.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating the pixel allocation of a portion of the image frames in FIG. 2.

DETAILED DESCRIPTION

Figure 1:
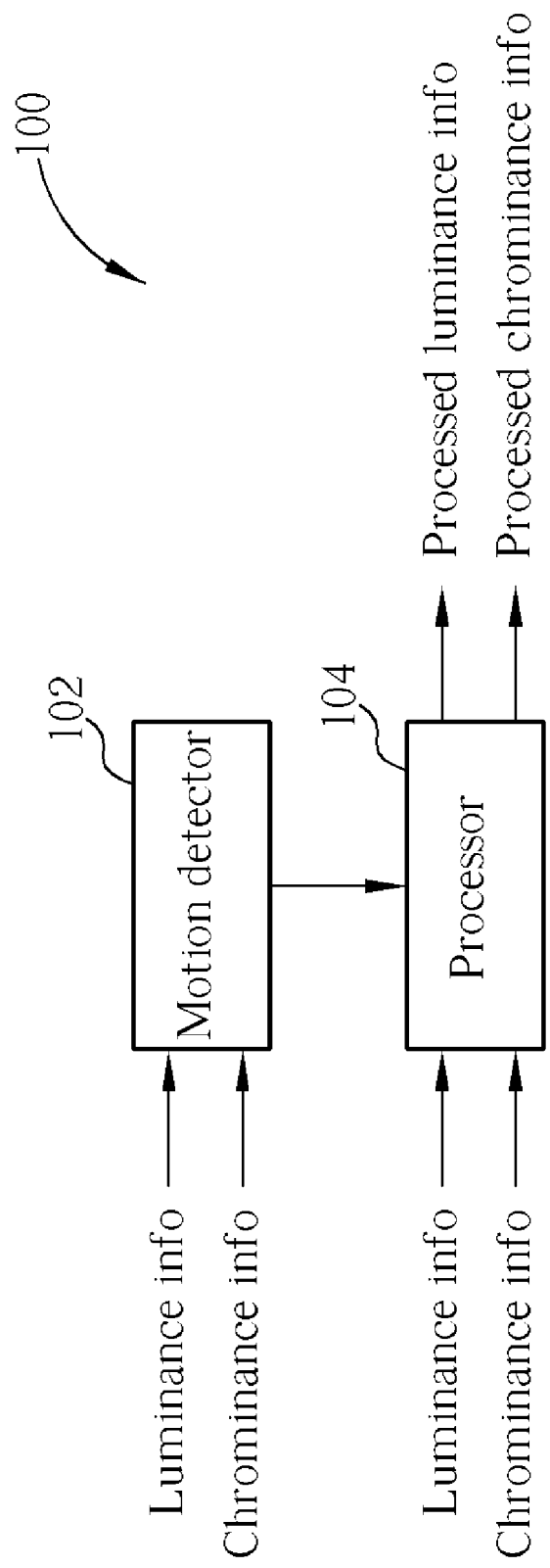
FIG. 1 is a block diagram of a cross color and cross luminance suppression apparatus according to an embodiment of the present invention.

Please refer to FIG. 1, which is a block diagram illustrating a cross color and cross luminance suppression apparatus 100 according to an embodiment of the present invention. In this embodiment, the apparatus 100 comprises a motion detector 102 and a processor 104. The motion detector 102 successively receives a plurality of pixel information, which may include, in one embodiment, luminance information (Y) and chrominance information (U and V, or C.sub.r and C.sub.b), representative of a series of pixel data in image frames. The motion detector 102 then generates a motion control signal according to the received pixel information. The motion control signal indicates whether a current pixel is deemed stationary (i.e., still), or deemed to be with motion. The processor 104 also receives the pixel information, here, the luminance information and the chrominance information, and performs cross color suppressing operation on the chrominance information, as well as cross luminance suppressing operation on the luminance information. By doing so, the pixel information output by the processor 104 is substantially free of cross color and cross luminance influence.

Figure 2:
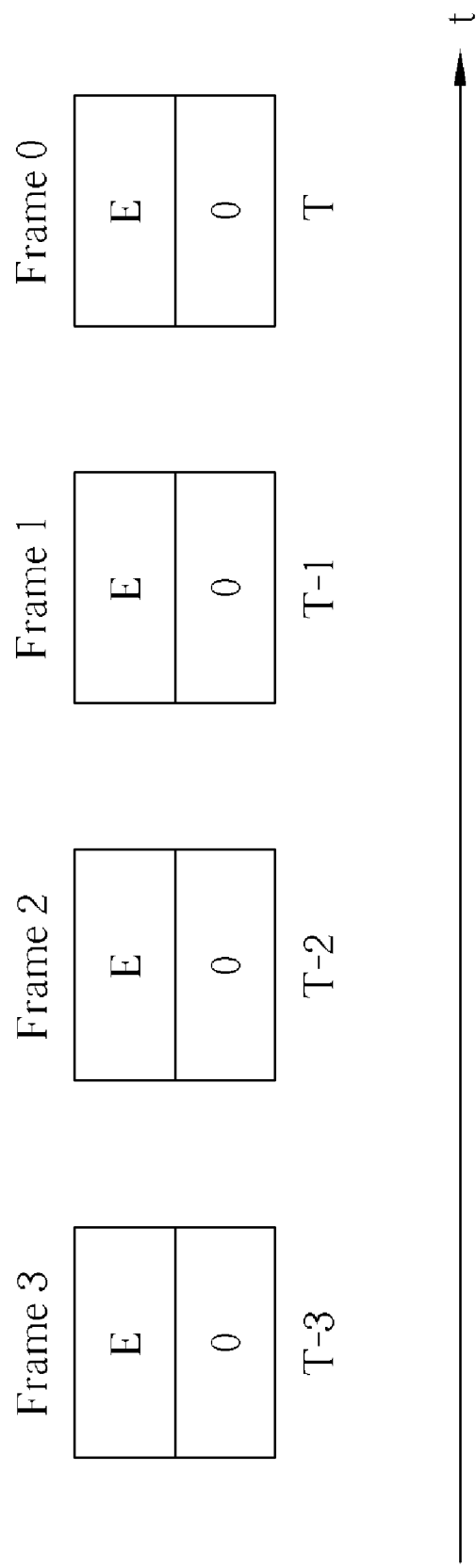
FIG. 2 is a timing diagram conceptually illustrating a plurality of sequentially incoming image frames of the apparatus in FIG. 1.
Figure 4:
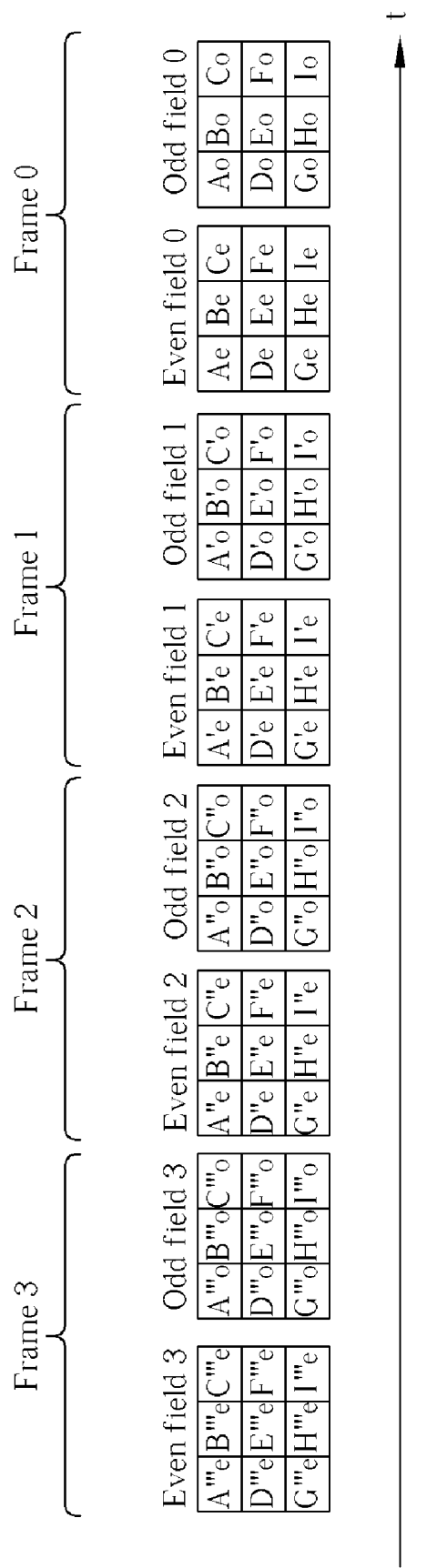
FIG. 4 is a timing diagram conceptually illustrating a plurality of sequentially incoming image fields of the apparatus in FIG. 1, embodied by the portion shown in FIG. 3 of a plurality of image frames in FIG. 2.

Before further explaining the operation of apparatus 100, certain preliminary knowledge pertaining image frame composition should be understood. Here, the well-known NTSC systems are hereby taken as an example for explanatory purpose. Please refer to FIG. 2, which is a timing diagram conceptually illustrating a plurality of sequentially incoming image frames of the apparatus 100. As is well-known in the art, in NTSC systems pixel data are sequentially transmitted and processed in a separate even field and odd field fashion, as illustrated in FIG. 4, while pixel data in the even field and in the odd field are interlaced to constitute a full image frame, as illustrated in FIG. 3. In FIG. 2, FIG. 3, and FIG. 4, four image frames 3, 2, 1, 0 are sequentially arranged at time T-3, T-2, T-1, and T in a timely fashion. It is to be noted that in FIG. 3 and FIG. 4 only a portion of an image frame (9 pixels in each field, or 18 pixels in each frame) is illustrated for simplicity, wherein the notations A, B, C, D, E, F, G, H, and I are representative of pixel data at respective location of a field, the substripts "e" and "o" correspond to the even field and the odd field, respectively, and the superscripts correspond to frame numbers.

As is well known to one of ordinary skill in the art, in NTSC systems, which are adopted as an example in the following description of the embodiment of the invention, the chrominance subcarrier phase rotates by 180 degrees between successive frames. This rotation causes luminance information to be misinterpreted as chrominance information, which oscillates between two complementary colors such as red and green; that is, the luminance appears to be spectral energy which oscillates between two colors represented by chrominance information 180 degrees out of phase with each other. Similar 180-degree phase rotation between successive frames can also be observed when examining the cross luminance phenomenon, i.e., the corruption of the luminance spectrum by the chrominance information.

Therefore, by averaging the chrominance information in two successive frames the out-of-phase cross color information cancels thereby allowing chrominance information to be obtained which is substantially free of cross color. Likewise, the cross luminance information can also be cancelled by similar averaging operation. However, this technique works most effective when the image is stationary, or still. As a result, a well-designed motion detection algorithm (or a stationary judgment algorithm) may serve to enhance the cross color suppression and/or cross luminance suppression effect, as well as the resultant display quality of the outcome of the processing, since improper cross color and/or cross luminance suppressing operation based on a poor motion detection algorithm degrades the display quality drastically.

As such, in an embodiment of the present invention, a motion detection algorithm adopted by the motion detector 102 is to be provided as in the following descriptions. Take the sequentially incoming image fields shown in FIG. 4 as an example, for each of the incoming pixel data (for example, the pixel Eo as a current pixel), the motion detector 102 checks for a number of conditions. As a first condition, the motion detector 102 checks for the similarity between the current frame 0 at time T and the previous frame 2 at time T-2, which is two frames prior to the current frame 0, for they are of the same phase in cross color/cross luminance phenomena. This condition may be implemented by observing the values of the following functions:

$$dY_1 = |Y_{Eo} - Y''_{Eo}| < \text{Thl}\_Y_1 \quad (1)$$

$$dU_1 = |U_{Eo} - U''_{Eo}| < \text{Thl}\_U_1 \quad (2)$$

$$dV_1 = |V_{Eo} - V''_{Eo}| < \text{Thl}\_V_1 \quad (3)$$

wherein Y, U, and V represent the one luminance information and two chrominance information of the corresponding pixel data, respectively, and Thl_Y, Thl_U, and Thl_V are threshold values, whose amounts should be determined according to actual applications. In this embodiment, only when the values of the above three functions (1), (2), and (3) are all true, is the first condition asserted to be true.

Please note that, although in this embodiment differences in pixel data between two frames are adopted to indicate the degree of similarity between two frames, other known way of indicating similarity may also be utilized. Please also note that, although in this embodiment only the pixel information of the current pixel (i.e., Eo) is adopted for similarity determination, more pixels may be incorporated into such determination. For example, the function of (1) may also be substituted by the following function:

$$dY_1 = \sum_{X = Ao \sim Io} |Y_X - Y''_X| < \text{Thl}\_Y_1 \quad (1)'$$

That is, in addition to the current pixel Eo, the surrounding eight pixels in the same field are also incorporated into the similarity determination. Of course, the number and position of pixels incorporated may be altered, and similar substitutions may also be asserted to functions (2) and/or (3).

Moreover, in determining whether the image is stationary or not for the current pixel, here, Eo, it may also be instructive to check for the similarity between a corresponding pixel (Ee) in the complementary field, here, the even field, of the same frame, and a pixel (Ee") two frames prior thereto. This is because pixels in the complementary field of the same frame contributes half of the frame, and therefore should be indicative in determining if an image being stationary or not. Likewise, the above-mentioned adoption of Y, U, and/or V pixel information in determining similarity, and the adoption of multiple pixels around the current pixel, may also be applied to such checking for similarity between the complememtary field and its predecessor two frames ahead.

When deriving a result for the first condition, it may also be meaningful to optionally check for the similarity between the preceding frame 1 at time T-1 of the current frame 0, and the frame 3 at time T-3, which is two frames prior to the frame 1. As an example, the following three functions can be utilized:

$$dY_2 = |Y'_{Eo} - Y'''_{Eo}| < Thl\_Y_2 \quad (4)$$

$$dU_2 = |U'_{Eo} - U'''_{Eo}| < Thl\_U_2 \quad (5)$$

$$dV_2 = |V'_{Eo} - V'''_{Eo}| < Thl\_V_2 \quad (6)$$

This is because in determining whether an image at time T is stationary or not, it might also be indicative to check if the image one frame ahead (i.e., at time T-1) is also stationary, for stillness of an image is construed in a consecutive context. In an embodiment where these functions are incorporated in determining the outcome of the first condition, only when the values of the functions (1), (2), (3), (4), (5), and (6) are all true, is the first condition asserted to be true.

Of course as can be appreciated by those of ordinary skill in the art, the above-mentioned adoption of multiple pixels around the current pixel, and the adoption of pixel information of the complementary fields may also be applied to such checking for stillness between the frame 1 and its predecessor frame 3, which is two frames ahead.

In addition to the first condition, a second condition, wherein the similarity between a frame that is one frame ahead of the current frame (i.e., the frame 1 at time T-1), and an adjacent frame thereof (for example, the frame 2 at time T-2), is further considered in determining the stillness of the image for the current pixel. The checking for similarity between two adjacent frames, though may not as significant due to the 180 degree out-of-phase characteristic in cross color of the NTSC systems, can still be of meaning in determining stillness, considering the consecutive nature of the stillness in image. In this embodiment, the second condition may be implemented by observing the values of the following functions:

$$dY_3 |Y'_{Eo} - Y''_{Eo}| < Thl\_Y_3 \quad (7)$$

$$dU_3 = U'_{Eo} - U''_{Eo}| < Thl\_U_3 \quad (8)$$

$$dV_3 = V'_{Eo} - V''_{Eo}| < Thl\_V_3 \quad (9)$$

Similarly in this embodiment, only when the values of the above three functions (7), (8), and (9) are all true, is the second condition asserted to be true.

In addition to the three functions (7), (8), and (9), further observations can be incorporated in determining the outcome of the second condition, such as the similarity between the frame which is two frames ahead of the current frame (i.e., the frame 2 at time T-2) and an adjacent frame thereof (for example, the frame 3 at time T-3). The following functions may serve as one such example:

$$dY_4 = |Y''_{Eo} - Y'''_{Eo}| < Thl\_Y_4 \quad (10)$$

$$dU_4 = |U''_{Eo} - U'''_{Eo}| < Thl\_U_4 \quad (11)$$

$$dV_4 = |V''_{Eo} - V'''_{Eo}| < Thl\_V_4 \quad (12)$$

And in such an embodiment, only when the values of the functions (7), (8), (9), (10), (11), and (12) are all true, is the second condition asserted to be true.

Please note that, when the required pixel information is available, the above-mentioned functions (7), (8), (9) may also be adapted to check the similarity between the frame 1 and the other adjacent frame thereof, which is the current frame 0, and the above-mentioned function (10), (11), (12) may also be adapted to check the similarity between the frame 2 and the other adjacent frame thereof, which is the frame 1. Also as can be appreciated by those of ordinary skill in the art, the above-mentioned adoption of multiple pixels around the current pixel, and the adoption of pixel information of the complementary fields may also be applied to such checking for similarity between two adjacent frames.

In addition to the first and the second conditions, a third condition, which is termed as the "high-frequency stillness" condition, is further examined in determining the stillness of the image for the current pixel. The third condition checks for the consecutive stationary situation of frames 0, 1, and 2 respectively at time T, T-1, and T-2 by utilizing, as an example, the following operations. First, the following operators are so defined:

$$d\text{Next}\_Y = Y'_{Eo} - Y''_{Eo}$$

$$d\text{Pre}\_Y = Y'_{Eo} - Y''_{Eo}$$

$$d\text{Next}\_U = U'_{Eo} - U_{Eo}$$

$$d\text{Pre}\_U = U'_{Eo} - U''_{Eo}$$

$$d\text{Next}\_V = V'_{Eo} - V''_{Eo}$$

$$d\text{Pre}\_V = V'_{Eo} - V'''_{Eo}$$

Then, the following condition pertaining the operator dNext_Y is checked to find out the value of an additional operator Next_Y:

```
if (dNext_Y > Thl_Y_5)
    Next_Y = 1(True)
elseif (dNext_Y < -Thl_Y_5)
    Next_Y = -1(True)
else
    Next_Y = 0(False)
```

Similar conditions respectively pertaining the operators dPre_Y, dNext_U, dPre_U, dNext_V, and dPre_V are also checked to find out corresponding operators Pre_Y, Next_U, Pre_U, Next_V, and Pre_V. And lastly, the following condition pertaining the operators Next_Y and Pre_Y is further checked to find out the value of yet another operator Next-Pre_Y:

```
if (Next_Y > 0 && Pre_Y > 0)
    NextPre_Y = 1(True)
elseif (Next_Y < 0 && Pre_Y < 0)
    NextPre_Y = 1(True)
else
    NextPre_Y = 0(False)
```

Similar conditions respectively pertaining to the operators Next_U and Pre_U, Next_V and Pre_V, are also checked to find out corresponding operators NextPre_U, and NextPre_V. Here if the value of the operator NextPre_Y is true, high-frequency alternation in Y domain is deemed existing, and high-frequency alternation phenomenon is not desirable for an image regarded as stationary. Therefore, in this embodiment, only when the values of the operators NextPre_Y, NextPre_U, and NextPre_V are all false, is the third condition asserted to be true. Please note that, to a person of ordinary skill in the art, it is understood that such a high-frequency stillness condition may also be expanded to incorporate laterally adjacent pixels (Do and/or Fo) and/or vertically adjacent pixels (Bo and/or Ho) of the current pixel Eo.

After all these operations are performed, the motion detector 102 determines whether the image is stationary or not for the current pixel. In this embodiment, the image is deemed stationary for the current pixel only when the first, the second, and the third conditions are all asserted to be true.

Please note that the hardware requirement, particularly the memory requirement, of the motion detector 102 to perform the above-mentioned condition check varies according to the complexity of conditions actually adopted, from 8 field buffers to 4 field buffers, as will be appreciated by those of ordinary skill in the art. Also note that here, the estimated field buffer requirement need not include currently incoming image field, taking the advantage of a pixel-by-pixel operation.

After the motion detector 102 decides whether the image is stationary or not for the current pixel, the motion control signal is then passed to the processor 104 to inform the processor 104 of the determination of the motion detector 102. If the image is deemed stationary for the current pixel, the cross color suppression and/or the cross luminance suppression operation is launched by, in this embodiment, averaging the pixel information across two consecutive image frames (for example, $(Y_{Eo}+Y_{Eo}')/2$, $(U_{Eo}+U_{Eo}')/2$, and $(V_{Eo}+V_{Eo}')/2$), or other suppression methods known to a skilled artisan. If the image is deemed not stationary (i.e., with motion), in this embodiment the current pixel is output as received.

Figure 5:
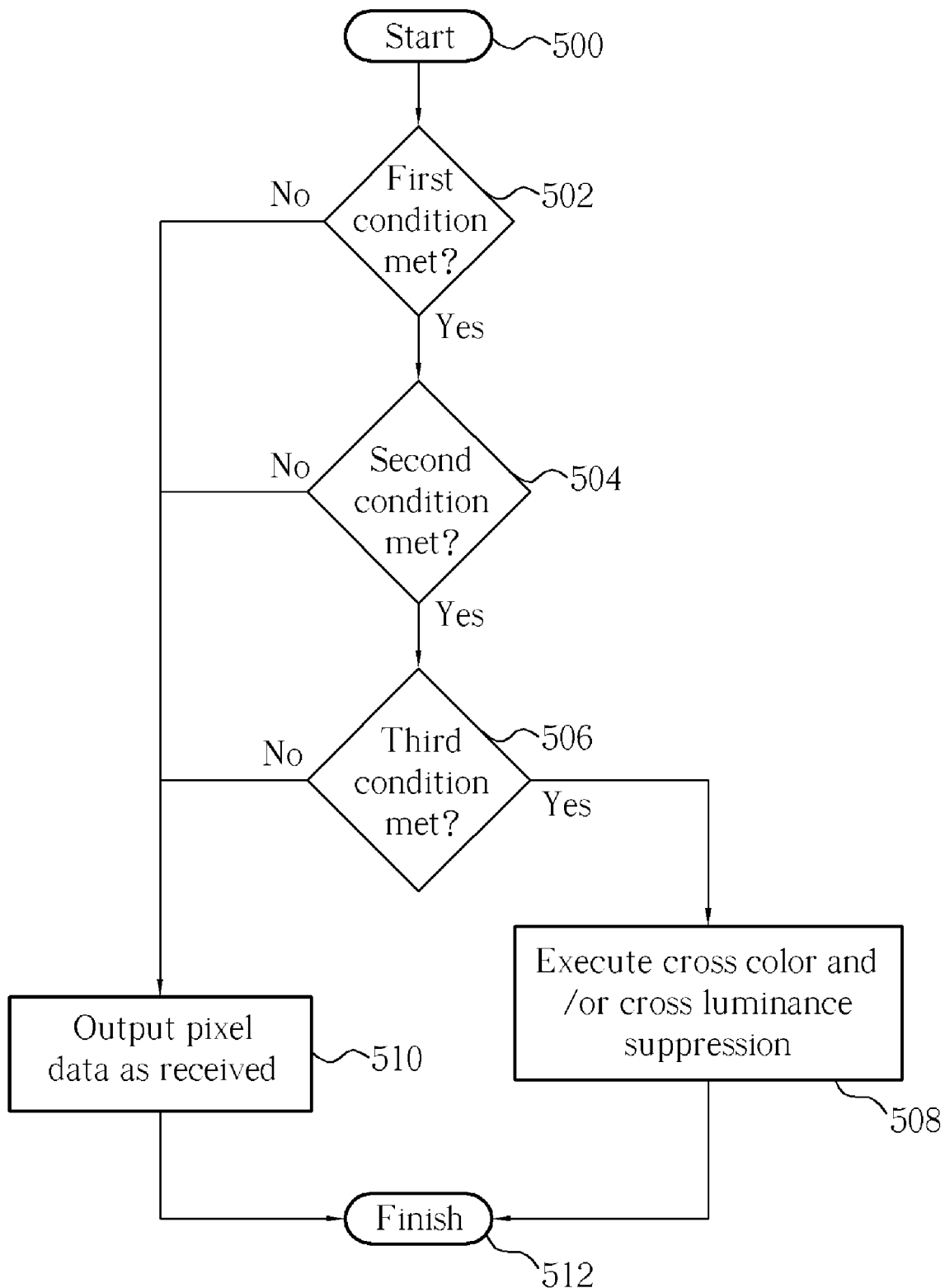
FIG. 5 is a flowchart illustrating the method of cross color and/or cross luminance suppression according to an embodiment of the present invention.

Please refer to FIG. 5, which is a flowchart illustrating the aforementioned condition checks and cross color and/or cross luminance suppression operation according to an embodiment of the present invention. A person of ordinary skill in the art should be able to understand that the order of performing the checking steps 502, 504, and 506 in FIG. 5 serves only as an example, is not meant to be limiting, and may be changed. Also note that when any of the first, the second, and the third condition is not met, pixel data are outputted as received in step 510 in this embodiment, further processing on the pixel data outputted may also be done in other embodiments.

Although the detailed description of the embodiments of the invention has been focused on the application in NTSC systems, the present invention may also be adapted to other display systems, such as the PAL systems. One point worth noting is that for PAL systems, the chrominance subcarrier phase rotates by 90 degrees between successive frames, as is the case for the luminance subcarrier. Therefore, the misinterpretation of luminance information as chrominance information rotates in phase by 90 degrees for each incoming frame. With this in mind, a skilled artisan should be able to substitute the claimed invention into a PAL system, and gain from similar improved display quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing an image in a video data, the video data comprising a plurality of frames, the method comprising:
obtaining a plurality of differences, each difference in the plurality of differences being obtained from two frames that are one frame apart, wherein each difference in the plurality of differences is between pixel information of one pixel from a plurality of pixels in one of the two frames, and a corresponding pixel in the other frame of the two frames;
examining a first criterion with a summation of the plurality of differences; and
performing cross color suppressing operation on a current frame of the plurality of frames according to a set of stationary image judgment information comprising a result of the first criterion examination.

2. The method of claim 1 further comprising:
obtaining a first difference set including at least a difference from the plurality of differences, and examining the first criterion with the first difference set.

3. The method of claim 2, wherein each difference in the first difference set further indicates differences between pixel information of one of a plurality of pixels in a vicinity of a target pixel in one of the two frames involving the difference and pixel information of a corresponding pixel in the other one of the two frames involving the difference.

4. The method of claim 3, wherein the first difference set further comprises a difference between pixel information of the target pixel and pixel information of a corresponding pixel in the other one of the two frames involving the difference.

5. The method of claim 2, wherein the two frames involving each difference in the first difference set comprises the current frame, and a frame, which is two frames prior to the current frame.

6. The method of claim 2, wherein the two frames involving each difference in the first difference set comprises a frame, which is one frame prior to the current frame, and a frame, which is three frames prior to the current frame.

7. The method of claim 2, wherein the first criterion comprises a comparison between a difference in the first difference set and a first threshold value.

8. The method of claim 2, further comprising:
obtaining a second difference set between pixel information of one of the plurality of frames and pixel information of another one of the plurality of frames, wherein the two frames involving the second difference set are adjacent to each other; and
examining a second criterion with the second difference set;
wherein the set of stationary image judgment information further comprising the result of a second criterion examination.

9. The method of claim 8, wherein the second difference set comprises a difference between pixel information of a target pixel in one of the two frames involving the second difference set and pixel information of a corresponding pixel in the other one of the two frames involving the second difference set.

10. The method of claim 9, wherein the second difference set comprises a plurality of absolute differences, each difference being between pixel information of one of a plurality of pixels within a vicinity of the target pixel and pixel information of a corresponding pixel in the other one of the two frames involving the second difference set.

11. The method of claim 8, wherein the second criterion comprises a comparison between a difference in the second difference set and a second threshold value.

12. The method of claim 2, further comprising:
obtaining a third difference set among pixel information of three successive frames of the plurality of frames; and
examining a third criterion with the third difference set;
wherein the set of stationary image judgment information further comprising the result of a third criterion examination.

13. The method of claim 12, wherein the three successive frames involving the third difference set comprises the current frame, a frame, which is one frame prior to the current frame, and a frame, which is two frames prior to the current frame.

14. A method for processing an image in a video data, the video data comprising a plurality of frames, the method comprising:

obtaining a first difference set between pixel information of one of the frames and pixel information of another one of the frames, wherein the two frames involving the first difference set are one frame apart, and the first difference set comprises a plurality of differences, each difference of the plurality of differences being between pixel information of a pixel in one of the two frames involving the first difference set and pixel information of a corresponding pixel in the other one of the two frames involving the first difference set;

summing absolute values of each difference in the plurality of differences of the first difference set to thereby obtain a sum of absolute differences;

examining a first criterion according to the sum of absolute differences; and performing cross color suppressing operation on pixel information of a current frame of the plurality of frames according to a set of stationary image judgment information comprising a result of the first criterion examination.

15. The method of claim 14, wherein each difference of the plurality of differences is further between pixel information of a target pixel in one of the two frames involving the first difference set and pixel information of a pixel corresponding in position to the target pixel in the other one of the two frames involving the first difference set.

16. The method of claim 14, wherein the plurality of differences comprises at least one difference between pixel information of a first pixel in a vicinity of a target pixel in one of the two frames involving the first difference set and pixel information of a second pixel corresponding in position to the first pixel in the other one of the two frames involving the first difference set.

17. The method of claim 14, wherein the first criterion comprises a comparison between the sum of absolute differences and a first threshold value.

* * * * *